United States Patent
Baldwin et al.

(10) Patent No.: US 7,322,146 B1
(45) Date of Patent: Jan. 29, 2008

(54) FISHING NET RETRACTION SYSTEM

(75) Inventors: John G. Baldwin, Sutter, CA (US); Robert W. Piatt, Yuba City, CA (US)

(73) Assignee: B & P Innovations, LLC, Sutter, CA (US)

( * ) Notice: Subject to any disclaimer, the term of this patent is extended or adjusted under 35 U.S.C. 154(b) by 86 days.

(21) Appl. No.: 11/339,302

(22) Filed: Jan. 24, 2006

Related U.S. Application Data

(60) Provisional application No. 60/647,249, filed on Jan. 25, 2005.

(51) Int. Cl.
*A01K 77/00* (2006.01)

(52) U.S. Cl. ............................. 43/12; 43/11; 24/16 PB; 24/303; 24/343

(58) Field of Classification Search .................... 43/7, 43/8, 11, 12; 24/16 PB, 303, 343–345; 248/74.2, 74.3, 230.8, 206.5, 467, 683
See application file for complete search history.

(56) References Cited

U.S. PATENT DOCUMENTS

| | | | | |
|---|---|---|---|---|
| 525,619 | A * | 9/1894 | Pearsons | 43/12 |
| 1,736,624 | A * | 11/1929 | Richardson | 43/12 |
| 2,172,175 | A * | 9/1939 | Probst | 43/11 |
| 2,455,765 | A * | 12/1948 | Harvey | 43/11 |
| 2,469,978 | A * | 5/1949 | Mrozinski | 43/11 |
| 2,504,356 | A * | 4/1950 | Stalker | 43/11 |
| 2,578,237 | A * | 12/1951 | Geistweit | 43/11 |
| 2,630,646 | A * | 3/1953 | Jensen et al. | 43/12 |
| 2,688,815 | A * | 9/1954 | Phillips | 43/12 |
| 2,724,920 | A * | 11/1955 | Boehm | 43/12 |
| 2,907,085 | A * | 10/1959 | Bosland | 24/303 |
| 2,975,497 | A * | 3/1961 | Budreck | 24/303 |
| 3,000,384 | A * | 9/1961 | Piers, Jr. | 24/16 PB |
| 3,023,530 | A * | 3/1962 | Jacob | 43/12 |
| 3,111,736 | A * | 11/1963 | Budreck | 24/303 |
| 3,289,990 | A * | 12/1966 | Grantham | 248/683 |
| 3,472,391 | A * | 10/1969 | Bolognesi | 248/683 |
| 4,477,993 | A * | 10/1984 | Woermbke | 43/11 |
| 4,516,347 | A * | 5/1985 | Dickie | 43/11 |
| 4,571,875 | A * | 2/1986 | Ballas | 43/11 |
| 4,653,214 | A * | 3/1987 | Cline | 43/11 |
| 4,774,783 | A * | 10/1988 | Willard | 43/12 |
| 4,815,227 | A * | 3/1989 | Flanders, Sr. | 43/12 |
| 5,025,843 | A * | 6/1991 | Caufield | 206/315.4 |
| 5,048,158 | A * | 9/1991 | Koerner | 24/16 PB |
| 5,050,276 | A * | 9/1991 | Pemberton | 24/303 |

(Continued)

FOREIGN PATENT DOCUMENTS

AU 668346 B * 4/1996

(Continued)

*Primary Examiner*—Darren W. Ark

(57) ABSTRACT

A fishing net retraction system for efficiently retracting a receiving net during non-use to avoid entanglement while allowing expansion of the receiving net upon receiving a fish. The fishing net retraction system includes a base attachable to a handle of a fishing net, a first connector attached to the base, a connecting device attachable to a receiving net of the fishing net, and a second connector attached to the connecting device, wherein said second connector is removably attachable to the first connector. The first connector and the second connector are preferably comprised of magnets that are attracted to one another while allowing separation upon receiving a fish within the receiving net.

18 Claims, 12 Drawing Sheets

U.S. PATENT DOCUMENTS

| | | | |
|---|---|---|---|
| 5,099,659 A * | 3/1992 | Carranza et al. | 24/303 |
| 5,168,603 A * | 12/1992 | Reed | 24/16 PB |
| 5,197,168 A * | 3/1993 | Levy | 24/303 |
| 5,214,874 A * | 6/1993 | Faulkner | 24/16 PB |
| 5,276,989 A * | 1/1994 | Lumb et al. | 43/11 |
| 5,385,666 A * | 1/1995 | Perlsweig | 43/12 |
| 5,456,037 A * | 10/1995 | Dorval | 43/11 |
| 5,568,697 A * | 10/1996 | Schwartz | 43/12 |
| D381,781 S * | 7/1997 | Clay | D22/135 |
| 5,845,373 A * | 12/1998 | Langer | 24/303 |
| 5,857,651 A * | 1/1999 | Kunevicius | 248/230.8 |
| 5,996,267 A * | 12/1999 | Breckenridge | 43/12 |
| 6,032,399 A * | 3/2000 | DePoe | 43/12 |
| 6,178,684 B1 * | 1/2001 | Nyakas et al. | 43/12 |
| 6,193,202 B1 * | 2/2001 | Rogers | 248/683 |
| 6,381,890 B1 * | 5/2002 | Sjostedt | 248/683 |
| 6,561,206 B1 * | 5/2003 | Wilkinson | 248/206.5 |
| 6,651,945 B2 * | 11/2003 | Rivellino et al. | 248/206.5 |
| 6,672,551 B2 * | 1/2004 | Rivellino et al. | 248/206.5 |
| 6,681,515 B2 * | 1/2004 | Grill | 43/12 |
| 6,718,597 B2 * | 4/2004 | Geiger | 24/16 PB |
| 6,994,300 B2 * | 2/2006 | Labeirie et al. | 248/74.3 |
| 7,131,616 B2 * | 11/2006 | Livingstone | 248/206.5 |
| 7,179,032 B2 * | 2/2007 | Guy | 248/74.2 |
| 7,181,939 B2 * | 2/2007 | Andersen | 70/395 |
| 7,185,399 B2 * | 3/2007 | Logan | 24/16 PB |
| 7,269,921 B2 * | 9/2007 | Lee | 43/12 |
| 2004/0040196 A1 * | 3/2004 | Schwartz | 43/11 |
| 2004/0064996 A1 * | 4/2004 | Armenti | 43/7 |
| 2004/0173719 A1 * | 9/2004 | Mitchell | 248/206.5 |
| 2006/0249634 A1 * | 11/2006 | Van Walraven | 248/74.2 |
| 2007/0007398 A1 * | 1/2007 | Franks | 248/74.3 |
| 2007/0214702 A1 * | 9/2007 | Christiansen | 43/11 |

FOREIGN PATENT DOCUMENTS

| | | |
|---|---|---|
| CA | 2224637 A1 * | 9/1999 |
| DE | 19910067 A1 * | 9/2000 |
| FR | 2658699 A1 * | 8/1991 |
| GB | 2322279 A * | 8/1998 |
| GB | 2343097 A * | 5/2000 |
| JP | 2003-235403 A * | 8/2003 |
| JP | 2004-57034 A * | 2/2004 |

* cited by examiner

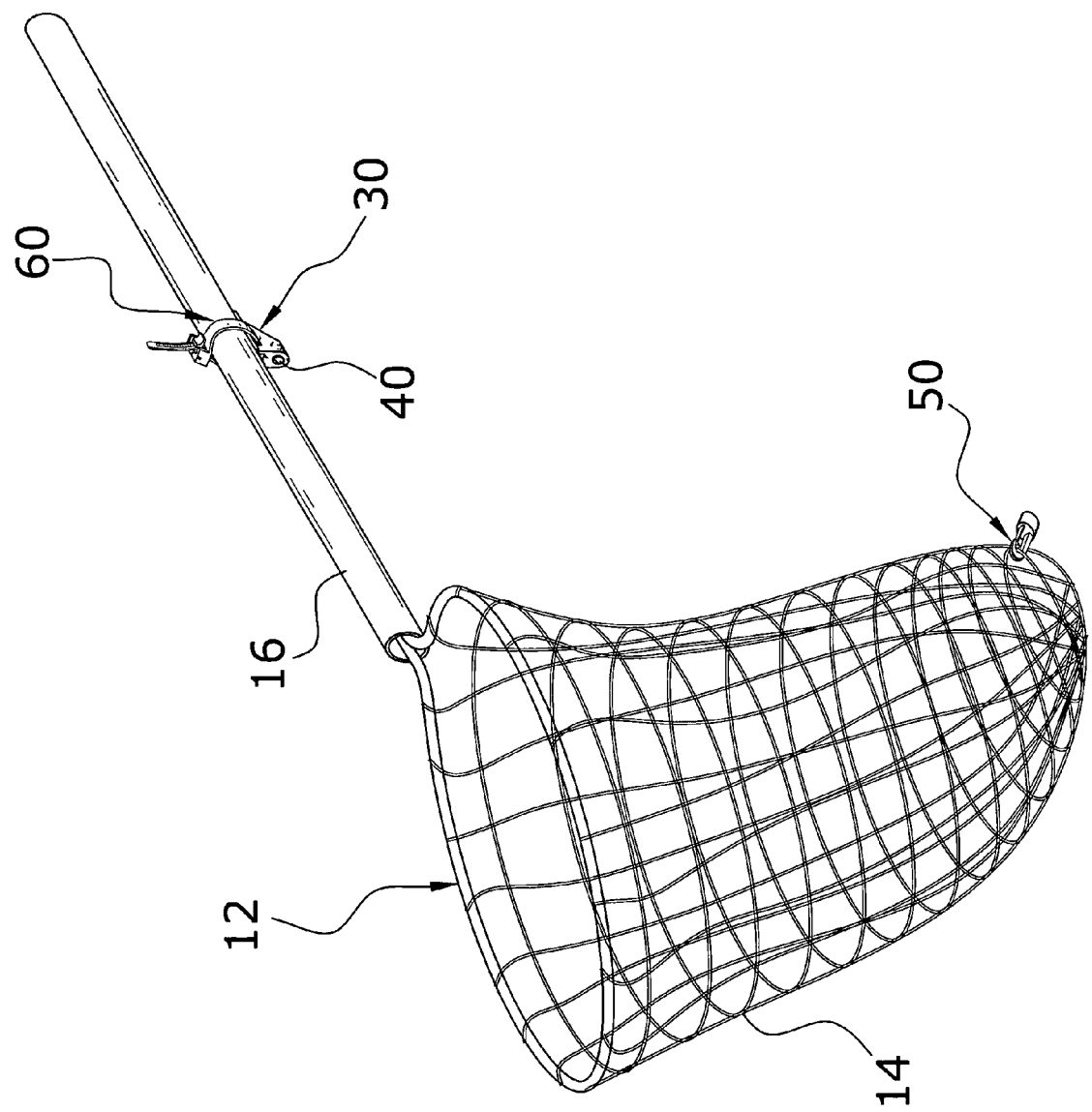

FISHING NET RETRACTION SYSTEM

CROSS REFERENCE TO RELATED APPLICATIONS

I hereby claim benefit under Title 35, United States Code, Section 119(e) of U.S. provisional patent application Ser. No. 60/647,249 filed Jan. 25, 2005. The 60/647,249 application is currently pending. The 60/647,249 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fishing nets and more specifically it relates to a fishing net retraction system for efficiently retracting a receiving net during non-use to avoid entanglement while allowing expansion of the receiving net upon receiving a fish.

2. Description of the Related Art

Any discussion of the prior art throughout the specification should in no way be considered as an admission that such prior art is widely known or forms part of common general knowledge in the field.

Fishing nets have been in use for years for receiving fish while still in the water. A conventional fishing net is comprised of a handle, a loop attached to the handle and a fishing net attached to the lower perimeter of the loop. The fishing net extends downwardly from the loop in a loose manner making it susceptible to catching upon and/or entangling with various objects.

While these devices may be suitable for the particular purpose to which they address, they are not as suitable for retracting a receiving net during non-use to avoid entanglement while allowing expansion of the receiving net upon receiving a fish. Fishing nets by themselves are susceptible to catching upon and/or entangling with various objects during non-use.

In these respects, the fishing net retraction system according to the present invention substantially departs from the conventional concepts and designs of the prior art, and in so doing provides an apparatus primarily developed for the purpose of efficiently retracting a receiving net during non-use to avoid entanglement while allowing expansion of the receiving net upon receiving a fish.

BRIEF SUMMARY OF THE INVENTION

In view of the foregoing disadvantages inherent in the known types of fishing nets now present in the prior art, the present invention provides a new fishing net retraction system construction wherein the same can be utilized for efficiently retracting a receiving net during non-use to avoid entanglement while allowing expansion of the receiving net upon receiving a fish.

To attain this, the present invention generally comprises a base attachable to a handle of a fishing net, a first connector attached to the base, a connecting device attachable to a receiving net of the fishing net, and a second connector attached to the connecting device, wherein said second connector is removably attachable to the first connector. The first connector and the second connector are preferably comprised of magnets that are attracted to one another while allowing separation upon receiving a fish within the receiving net.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fishing net retraction system that will overcome the shortcomings of the prior art devices.

A second object is to provide a fishing net retraction system for efficiently retracting a receiving net during non-use to avoid entanglement while allowing expansion of the receiving net upon receiving a fish.

Another object is to provide a fishing net retraction system that may be attached to various sizes, shapes and styles of fishing nets.

An additional object is to provide a fishing net retraction system that automatically allows the fishing net to expand when a fish is received within the fishing net.

A further object is to provide a fishing net retraction system that prevents the net from getting caught upon and/or entangled with objects during non-use or just before receiving a fish.

Another object is to provide a fishing net retraction system that is adjustable.

Another object is to provide a fishing net retraction system that does not require the fisherman to use both hands to net a fish.

Another object is to provide a fishing net retraction system that is removably attached to a fishing net.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 7b is an upper perspective view of the present invention attached to a fishing net.

DETAILED DESCRIPTION OF THE INVENTION

A. Overview

Figure 1:
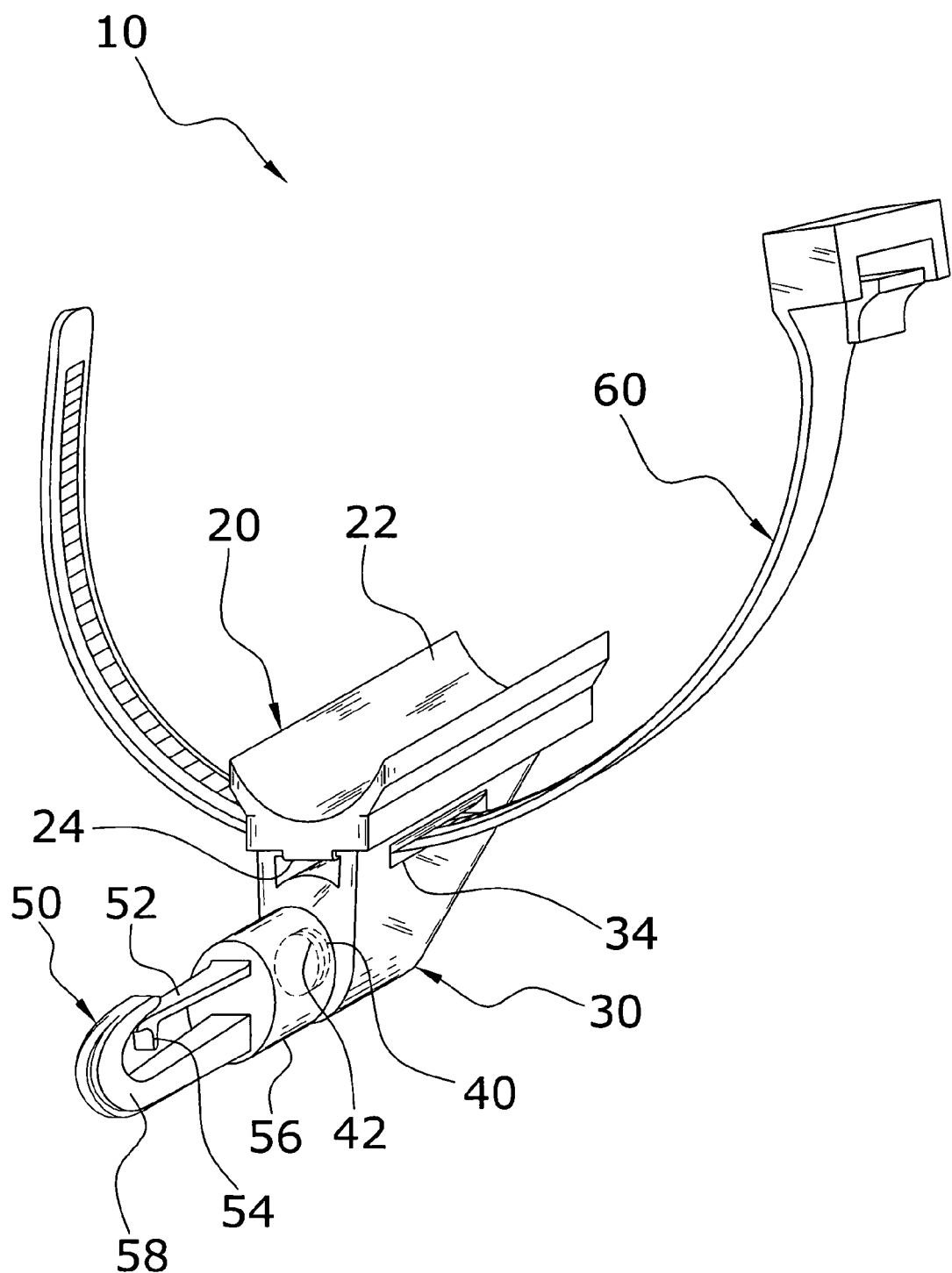
FIG. 1 is an upper perspective view of the present invention.

Turning now descriptively to the drawings, in which similar reference characters denote similar elements throughout the several views, FIGS. 1 through 8b illustrate a fishing net retraction system 10, which comprises a base 30 attachable to a handle 16 of a fishing net 12, a first connector 40 attached to the base 30, a connecting device 50 attachable to a receiving net 14 of the fishing net 12, and a second connector 42 attached to the connecting device 50, wherein said second connector 42 is removably attachable to the first connector 40. The first connector 40 and the second connector 42 are preferably comprised of magnets that are attracted to one another while allowing separation upon receiving a fish within the receiving net 14.

B. Base

FIGS. 1 through 4 illustrate an exemplary base 30 attachable to a handle 16 of a fishing net 12. The base 30 may be comprised of various structures and configurations attachable to the handle 16 of the fishing net 12.

Figure 2:
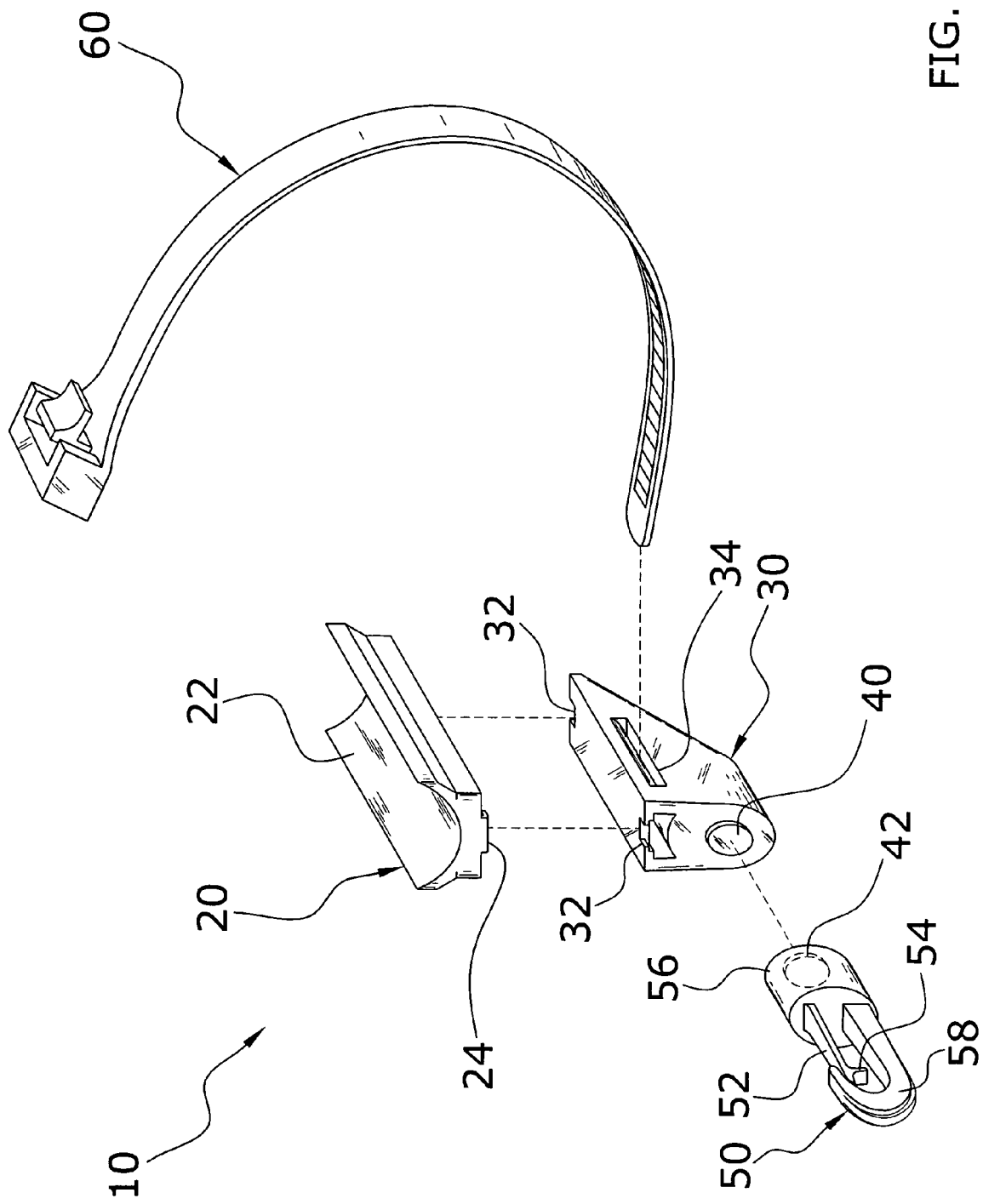
FIG. 2 is an exploded upper perspective view of the present invention.

To avoid slippage upon the handle 16, an engaging member 20 is preferably attached to the base 30 as shown in FIGS. 1 through 4 of the drawings. The engaging member 20 is comprised of a gripping material (e.g. rubber, elastomer) for preventing rotational and longitudinal movement when attached to the handle 16. The engaging member 20 preferably includes a receiving channel 22 to receive the handle 16 of the fishing net 12 as illustrated in FIGS. 1 and 2 of the drawings. The engaging member 20 may be attached to the base 30 in various manners such as with a plurality of catch members 24 extending from the engaging member 20 that selectively engage corresponding catch slots 32 within the base 30 as shown in FIG. 2 of the drawings.

C. Strap

A strap 60 or similar device is attachable to the base 30 for securing the base 30 to the handle 16 of the fishing net 12. The strap 60 may be directly attached to the base 30 or it may extend through a receiver slot 34 in the base as illustrated in FIGS. 1 and 2 of the drawings.

Figure 7A:
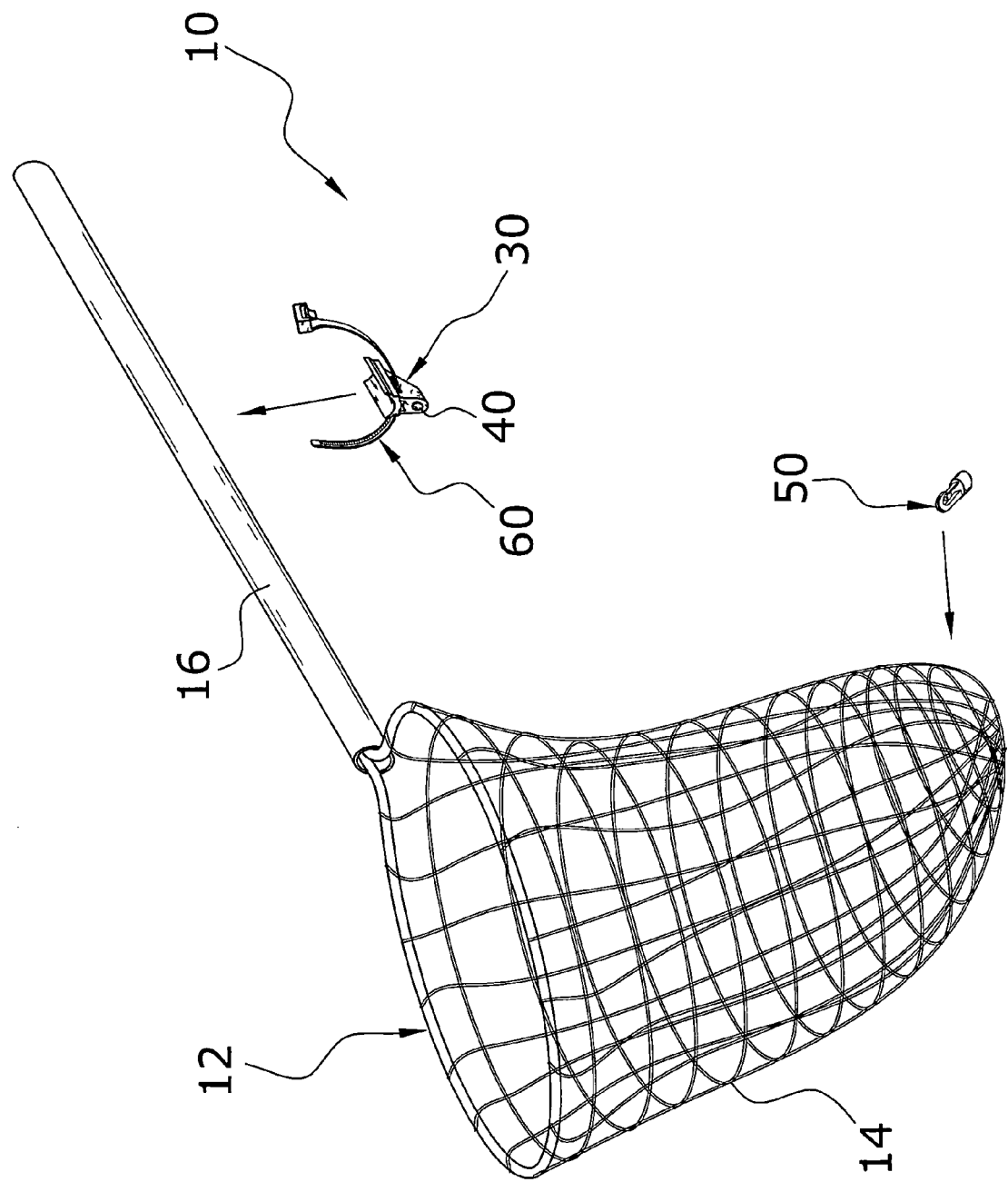
FIG. 7a is an exploded upper perspective view of the present invention with respect to a fishing net prior to being attached to the fishing net.

The strap 60 is formed and has a sufficient length to surround a handle 16 of a fishing net 12 as best illustrated in FIGS. 7a and 7b of the drawings. The strap 60 is preferably comprised of a cable tie (a.k.a. zip tie), however the strap 60 may include a hook fastener and a loop fastener connectable to one another. The strap 60 is preferably adjustable to allow for adjustment of the base 30 along the length and rotationally upon the handle 16 of the fishing net 12.

D. Connecting Device

A connecting device 50 is removably attachable to a receiving net 14 of the fishing net 12 as best illustrates in FIGS. 1 through 4 of the drawings. The connecting device 50 is comprised of any device capable of selectively engaging a portion of the receiving net 14 either in a hooked manner or a gripping manner.

Figure 3:
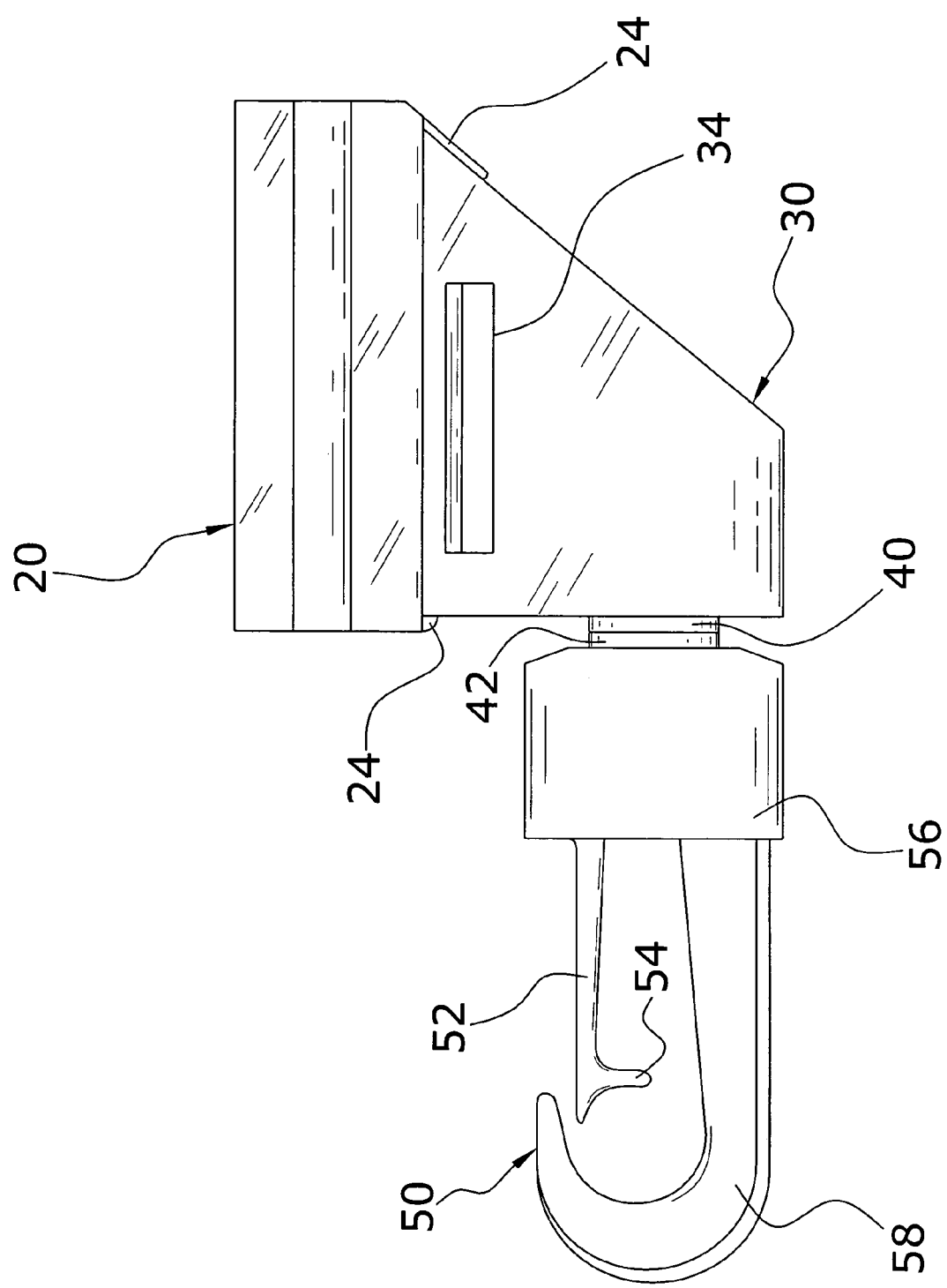
FIG. 3 is a side view of the present invention with the connecting device attached to the base.
Figure 4:
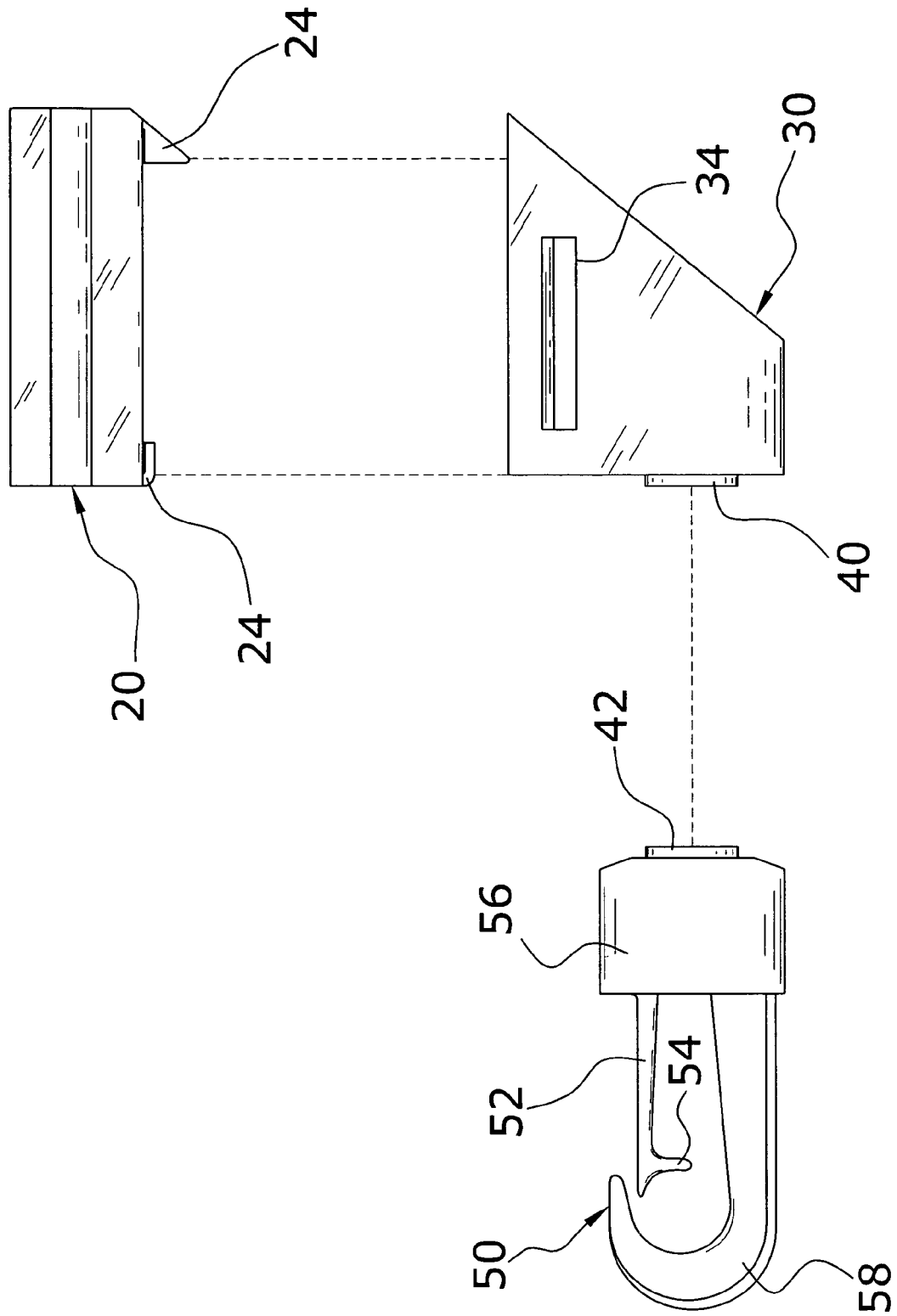
FIG. 4 is a side view of the present invention with the connecting device removed from the base.
Figure 5:
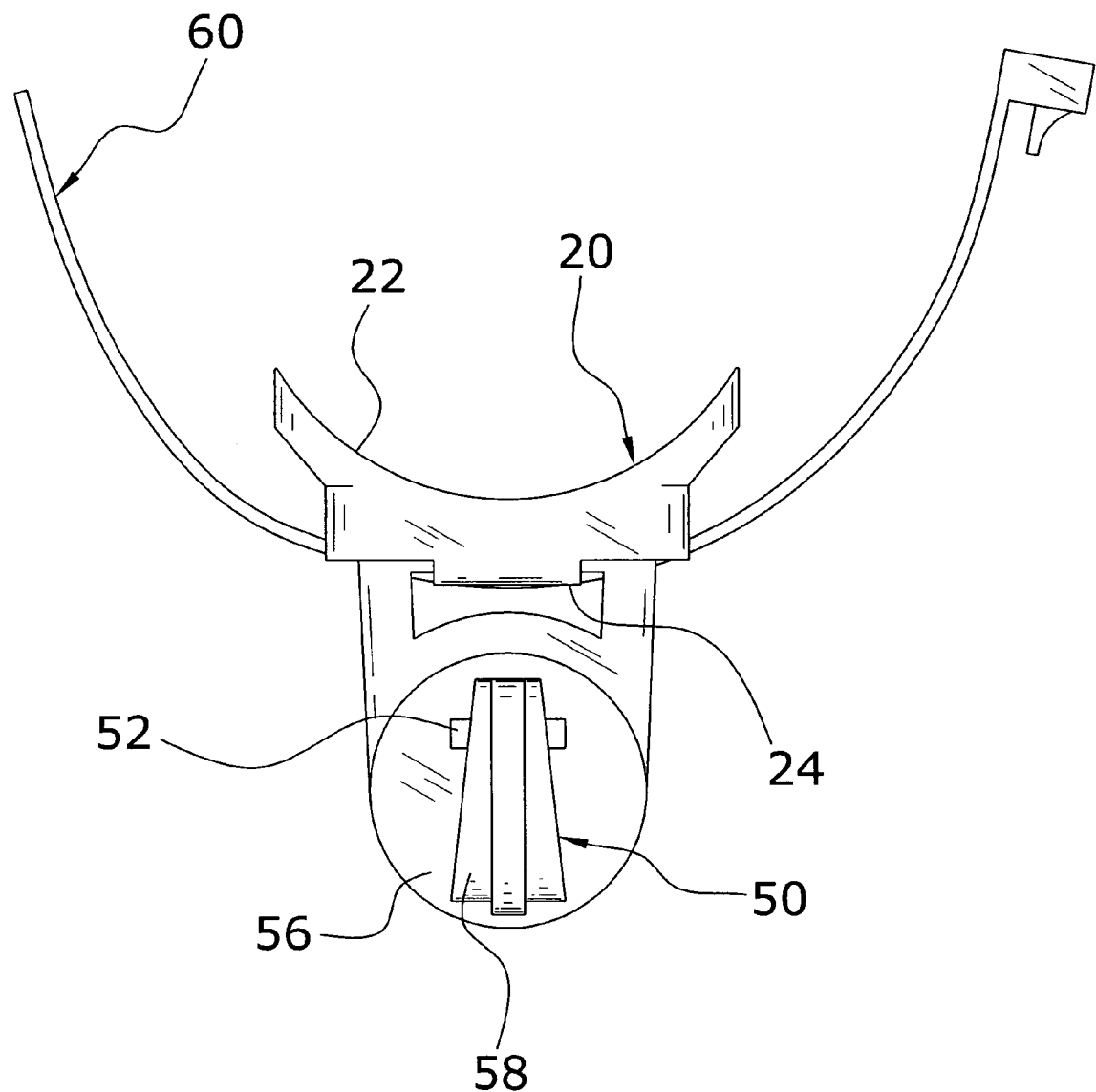
FIG. 5 is a first end view of the present invention.
Figure 6:
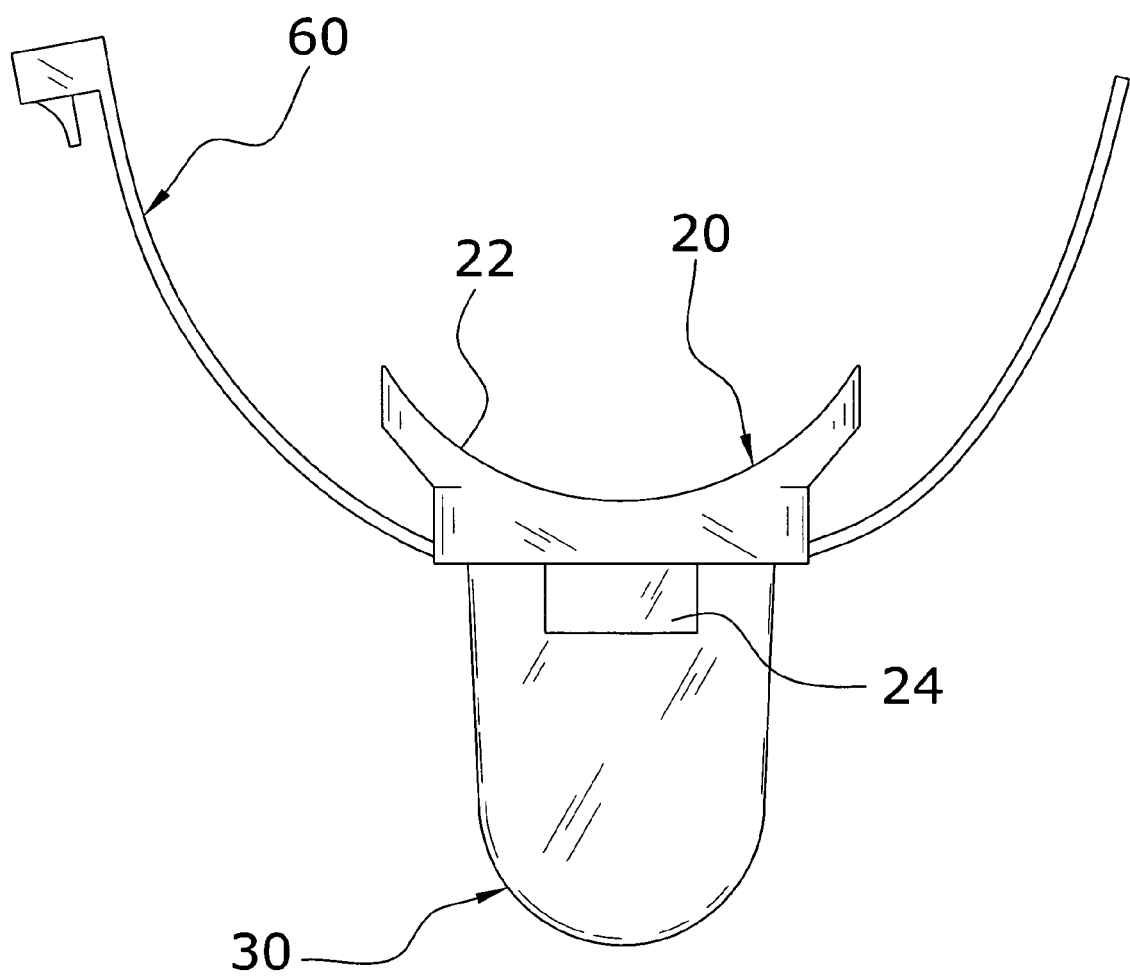
FIG. 6 is a second end view of the present invention opposite of the first end view of FIG. 5.

As best illustrated in FIGS. 3 and 4, the connecting device 50 is preferably comprised of a body 56 and a hook member 58 extending from the body 56. The hook member 58 catchably engages a portion of the receiving net 14 as illustrated in FIG. 7b of the drawings. A latch 52 preferably resiliently extends from the body 56 for selectively closing the interior of the hook member 58 thereby retaining the portion of the receiving net 14 caught within the hook member 58. A nub 54 preferably extends inwardly from a distal portion of the latch 52 to help prevent the receiving net 14 from escaping the connecting device 50.

E. Connectors

The first connector 40 is attached to the base 30 and the second connector 42 is attached to the body 56 of the connecting device 50 as best illustrated in FIGS. 3 and 4 of the drawings. The second connector 42 is removably attachable to the first connector 40 in an attracted manner. The first connector 40 and the second connector 42 are preferably comprised of magnets which may be adjusted in magnetic attraction depending upon the size of fish to be caught.

F. Use and Operation of Invention

Figure 7C:
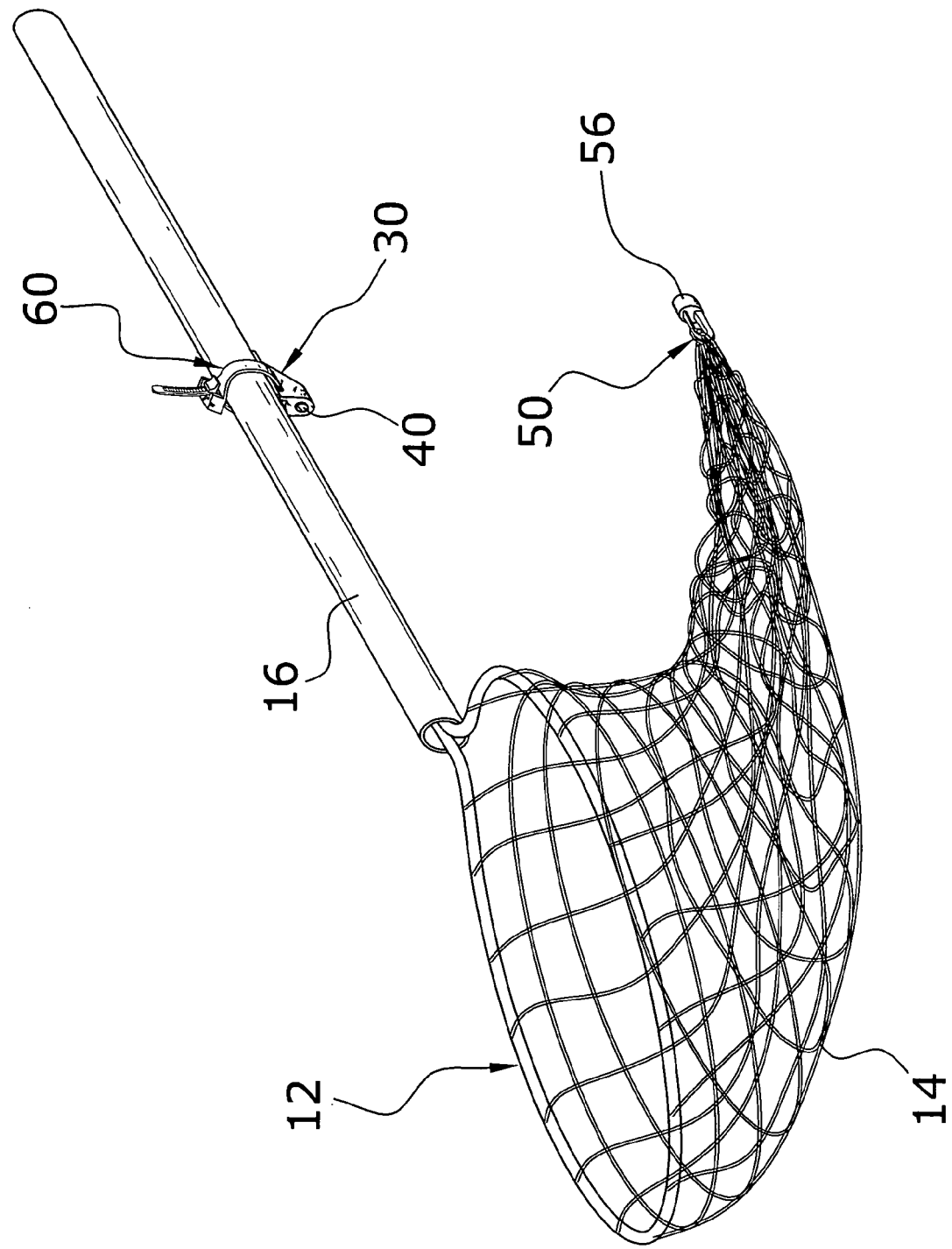
FIG. 7c is an upper perspective view of the receiving net partially moved towards the base.
Figure 7D:
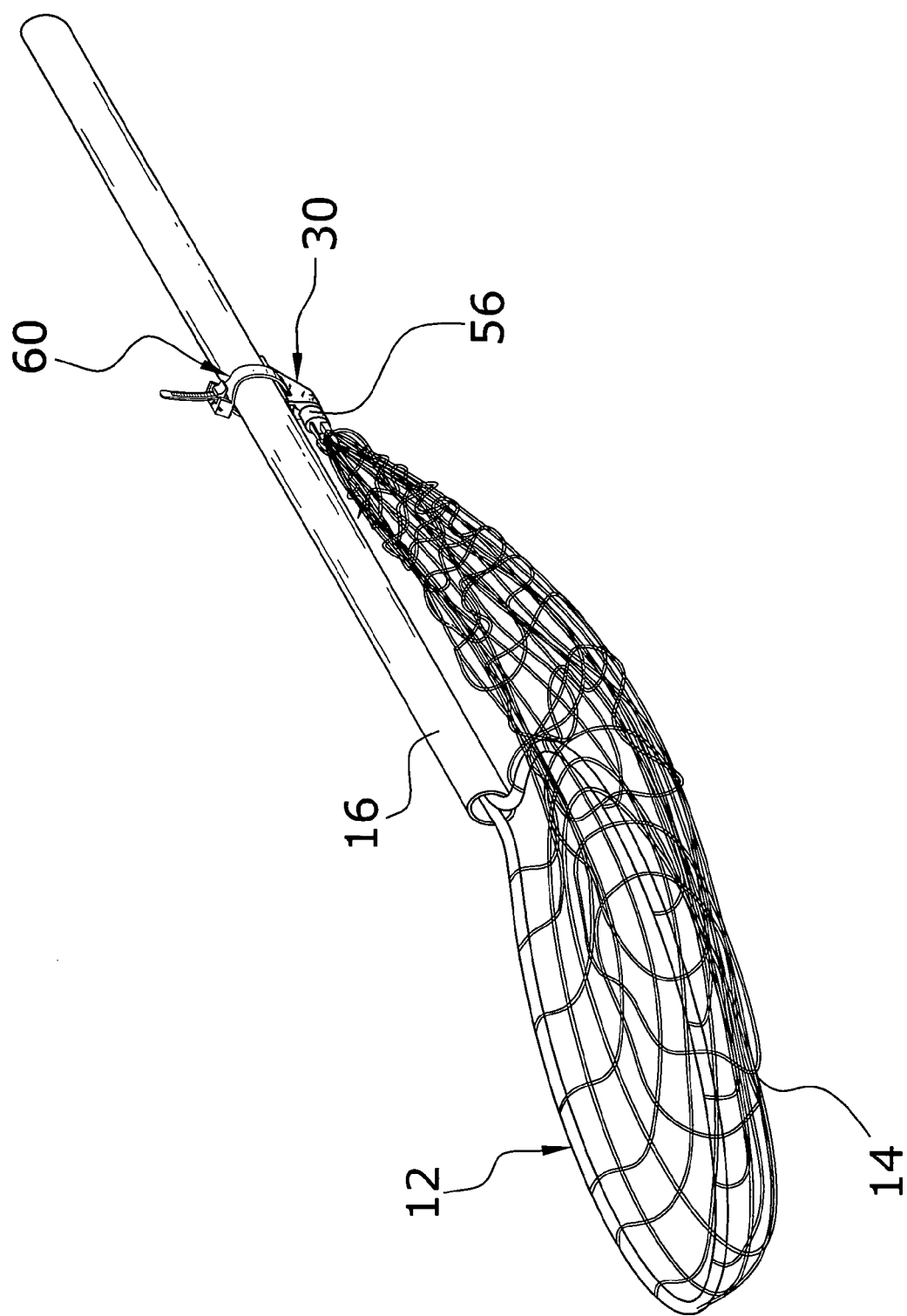
FIG. 7d is an upper perspective view of the receiving net retracted into a relatively taught and out of the way storage location.

To attach the present invention to a fishing net 12, the strap 60 is first attached to the base 30 and positioned near the handle 16 as shown in FIG. 7a of the drawings. The user then extends the strap 60 about the handle 16 in a relatively loose manner to allow for rotation and sliding of the base 30 with respect to the handle 16. The connecting device 50 is then attached to a lower end of the receiving net 14 as shown in FIG. 7b of the drawings. The receiving net 14 is retracted towards the base 30 as shown in FIG. 7c until the second connector 42 becomes connected to the first connector 40. The user then adjusts the position of the base 30 to a location wherein the receiving net 14 is relatively taut without causing the connectors 40, 42 to become disengaged as shown in FIG. 7d of the drawings. The strap 60 is then fully secured about the handle 16 of the fishing net 12 thereby preventing further movement of the base 30.

Figure 8A:
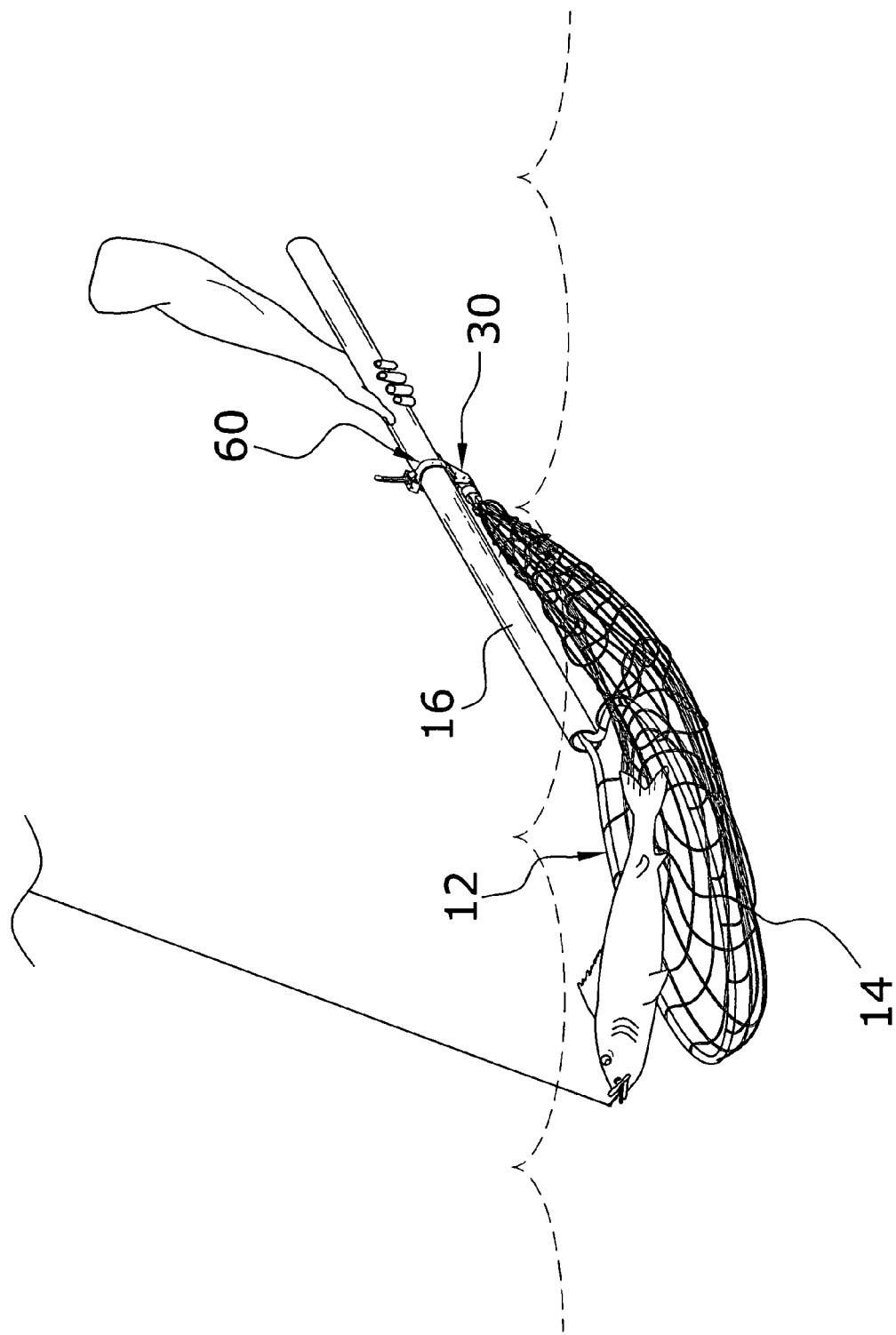
FIG. 8a is an upper perspective view of the present invention retaining the receiving net in the substantially retracted positioned prior to receiving a fishing.
Figure 8B:
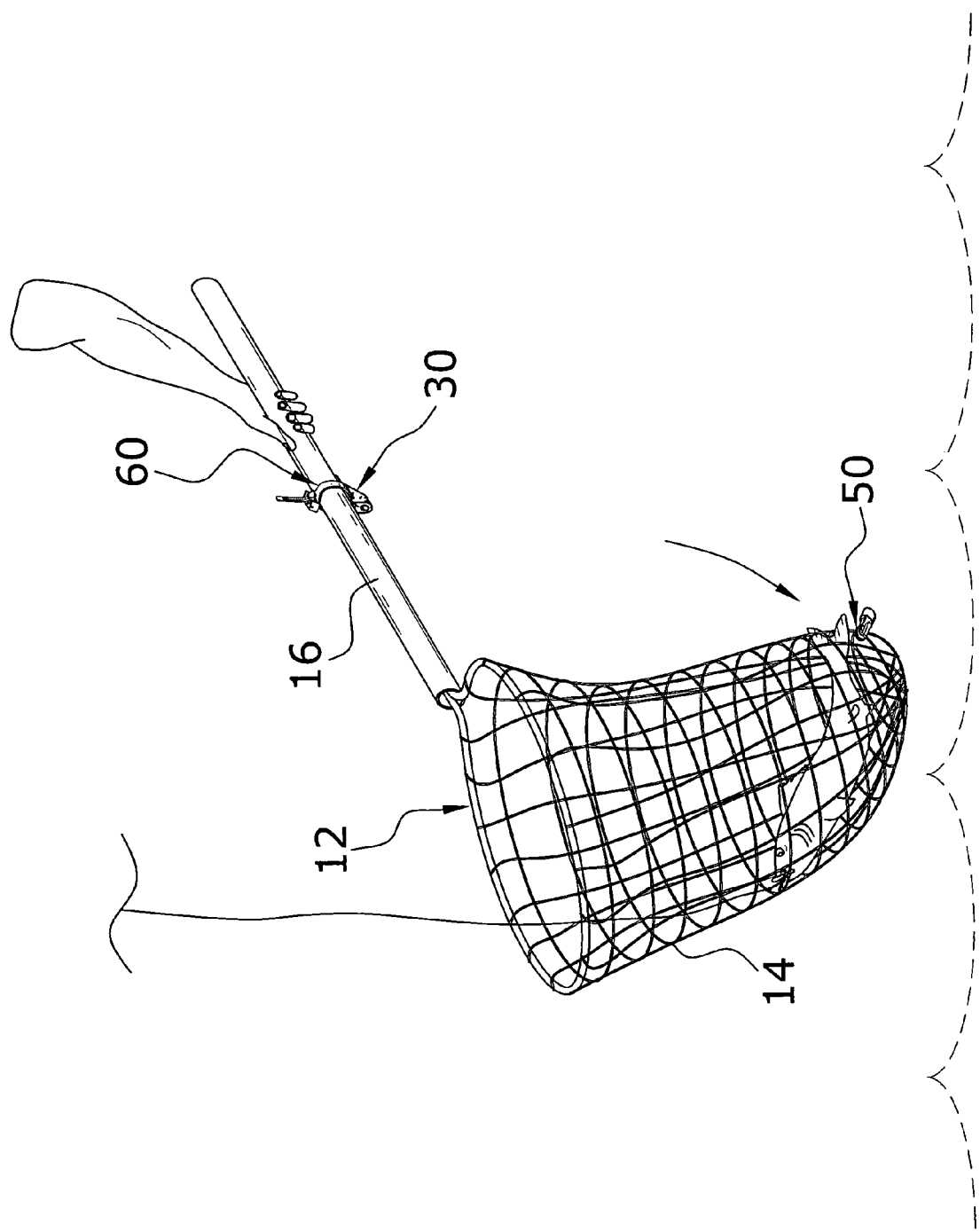
FIG. 8b is an upper perspective view of the present invention releasing the receiving net to allow expansion of the receiving net to catch the fish.

In use, the receiving net 14 is maintained in the retracted position until a fish is received within the receiving net 14 as shown in FIG. 8a of the drawings. When the fish is received within the fishing net 12, the weight of the fish engaging the receiving net 14 causes the second connector 42 to become separated from the first connector 40 thereby allowing the fishing net 12 to expand to receive the fish as shown in FIG. 8b of the drawings. Once the fish is removed from the receiving net 14, the connecting device 50 is reattached to the base 30 and the above process is repeated.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A fishing net retraction system, comprising:
    a base attachable to a handle of a fishing net;
    an engaging member attached to said base, wherein said engaging member is comprised of a gripping material for preventing movement when attached to a handle of a fishing net, wherein said engaging member includes a receiving channel to receive a handle of a fishing net;
    a first connector attached to said base;
    a connecting device attachable to a receiving net of said fishing net;
    a second connector attached to said connecting device, wherein said second connector is removably attachable to said first connector, wherein said first connector is attracted to said second connector, and wherein said first connector and said second connector are comprised of magnets;
    wherein said connecting device is comprised of a body and a hook member extending from said body, wherein said second connector is attached to said body, a latch resiliently extending from said body for selectively closing said hook member; and
    a strap attachable to said base, wherein said strap is formed to surround a handle of a fishing net.

2. The fishing net retraction system of claim 1, wherein said engaging member includes a plurality of catch members that selectively engage corresponding catch slots within said base.

3. The fishing net retraction system of claim 1, including a nub extending inwardly from a distal portion of said latch.

4. A fishing net in combination with a retraction system, comprising:
    a fishing net having a receiving net and a handle;
    the retraction system comprising:
        a base attached to said handle of said fishing net;
        a first connector attached to said base;
        a connecting device attached to said receiving net of said fishing net; and
        a second connector attached to said connecting device, wherein said second connector is removably attached to said first connector, wherein said first connector is attracted to said second connector, and wherein said first connector and said second connector are comprised of magnets.

5. The fishing net in combination with a retraction system of claim 4, including a strap extendable through a receiver slot within said base, wherein said strap is formed to surround said handle of said fishing net.

6. The fishing net in combination with a retraction system of claim 5, wherein said strap is comprised of a cable tie.

7. The fishing net in combination with a retraction system of claim 4, including a strap attached to said base, wherein said strap is formed to surround said handle of said fishing net.

8. The fishing net retraction system of claim 7, wherein said strap is comprised of a cable tie.

9. The fishing net in combination with a retraction system of claim 4, including an engaging member attached to said base, wherein said engaging member is comprised of a gripping material for preventing movement when attached to said handle of said fishing net.

10. The fishing net in combination with a retraction system of claim 9, wherein said engaging member includes a receiving channel to receive said handle of said fishing net.

11. The fishing net in combination with a retraction system of claim 9, wherein said engaging member includes a plurality of catch members that selectively engage corresponding catch slots within said base.

12. The fishing net in combination with a retraction system of claim 1, wherein said connecting device is comprised of a body and a hook member extending from said body.

13. The fishing net in combination with a retraction system of claim 12, wherein said second connector is attached to said body.

14. The fishing net in combination with a retraction system of claim 12, including a latch resiliently extending from said body for selectively closing said hook member.

15. The fishing net in combination with a retraction system of claim 14, including a nub extending inwardly from a distal portion of said latch.

16. A fishing net in combination with a retraction system, comprising:
    a fishing net having a receiving net and a handle;
    a base attached to said handle of said fishing net;
    a first connector attached to said base;
    a connecting device attached to said receiving net of said fishing net;
    a second connector attached to said connecting device, wherein said second connector is removably attached to said first connector;
    wherein said first connector and said second connector are comprised of magnets; and
    a strap extendable through a receiver slot within said base, wherein said strap surrounds said handle of said fishing net.

17. The fishing net in combination with a retraction system of claim 16, including an engaging member attached to said base, wherein said engaging member is comprised of a gripping material for preventing movement when attached to said handle of said fishing net.

18. The fishing net in combination with a retraction system of claim 16, wherein said connecting device is comprised of a body and a hook member extending from said body, wherein said hook member is attached to said receiving net.

* * * * *